United States Patent [19]

Thome et al.

[11] 4,304,755
[45] Dec. 8, 1981

[54] APPARATUS FOR MANUFACTURING VANADIUM PENTOXIDE

[75] Inventors: Roland Thome; Hubert Bings, both of Luenen; Hans Obermaier, Tacherting, all of Fed. Rep. of Germany

[73] Assignee: Vereinigte Aluminium-Werke Aktiengesellschaft, Bonn, Fed. Rep. of Germany

[21] Appl. No.: 913,816

[22] Filed: Jun. 8, 1978

Related U.S. Application Data

[62] Division of Ser. No. 774,855, Mar. 7, 1977, Pat. No. 4,119,707.

[30] Foreign Application Priority Data

Mar. 6, 1976 [DE] Fed. Rep. of Germany ....... 2609430

[51] Int. Cl.$^3$ .................... C01G 1/00; B01D 11/00; C01D 7/00
[52] U.S. Cl. .................... 422/149; 422/202; 422/205; 422/209; 422/225; 422/232
[58] Field of Search ............ 422/149, 164, 188, 136, 422/202, 205, 203, 209, 225, 232; 423/592; 432/106, 107, 108, 118; 366/56

[56] References Cited

U.S. PATENT DOCUMENTS

| | | | |
|---|---|---|---|
| 1,859,579 | 5/1932 | Bidaud | 422/209 |
| 2,255,539 | 9/1941 | Clarkson | 422/209 |
| 2,507,123 | 5/1950 | Sproule et al. | 422/209 |
| 2,603,556 | 7/1952 | Miller | 422/209 |
| 2,943,088 | 6/1960 | Westfall | 422/209 |
| 3,030,180 | 4/1962 | Bigot | 422/209 |
| 3,178,267 | 4/1965 | Larson | 422/209 |
| 3,220,804 | 11/1965 | Bachmann et al. | 422/209 |
| 3,224,839 | 12/1965 | Pierson | 422/209 |
| 3,295,930 | 1/1967 | Swanson et al. | 422/209 |
| 3,832,360 | 8/1974 | Hirz et al. | 422/209 |
| 3,880,407 | 4/1975 | List | 422/225 |
| 4,062,770 | 12/1977 | Kneer | 71/9 |

Primary Examiner—William F. Smith
Assistant Examiner—Chris Konkol
Attorney, Agent, or Firm—Darby & Darby

[57] ABSTRACT

Disclosed herein are a process and apparatus for manufacturing vanadium pentoxide in powder form by the thermal decomposition of ammonium metavanadate containing more than 10% NH$_3$ in a single operation.

18 Claims, 2 Drawing Figures

A = WATER VAPOR
B = NH₃ GAS
C = AIR
D = EXHAUST GAS MIXTURE

APPARATUS FOR MANUFACTURING VANADIUM PENTOXIDE

This application is a divisional application of copending application Ser. No. 774,855, now U.S. Pat. No. 4,119,707 filed Mar. 7, 1977.

The invention relates to a process and to equipment for manufacturing vanadium pentoxide in powder form by the thermal decomposition of ammonium metavanadate with more than 10% $NH_3$ in one processing step.

It is well known in the art that ammonium polyvanadate, with an $NH_3$ content of ca. 5%, can be processed to vanadium pentoxide at temperatures up to 400° C. under oxidizing conditions. This process is very time consuming, since the polyvanadate is not very soluble in water (solubility 0.5–1) and the temperatures are not adequate for driving off the $NH_3$ constituents quickly and completely. Moreover the known process operates in the strongly acid ph range, whereby the profitability suffers due to the high acid consumption and the granulation of the end product is disadvantageously affected.

It is furthermore well known in the art that the manufacture of vanadium pentoxide can be conducted at temperatures of about 800° C. However, because of the danger of explosion that exists with this process, care must be taken to prevent the decomposition gases ($NH_3$) from coming into contact with the oxygen-containing gases. It is well known that this can be ensured by carrying out the process in two separate installations.

Because of the dangerous and complicated reactions, ammonium polyvanadates, with $NH_3$ only up to 6%, have hitherto been used for the manufacture of vanadium pentoxide. For the reasons mentioned, it did not appear to be possible to use the inherently more soluble metavandates with $NH_3$ contents greater than 10%.

It is a primary object of the present invention to manufacture vanadium pentoxide from ammonium metavanadate in one processing step as a powder with solid granulation and in a process that has no harmful effects on the environment, the purity of the product being at least 90% $V_2O_5$ (without lower valent vanadium oxides).

In accordance with the invention, this is achieved by means of the instant process using ammonium metavanadate containing more than 10% ammonia by conducting a layer of said ammonia vanadate material through a heated drying zone and maintaining the vanadate in said zone until the water contained in said layer has been completely driven off. The dried material is conducted through a decomposition zone in which it is further heated and split into vanadium oxides, ammonium and water. The water vapor which is formed hydrolyzes the vanadium nitrides which are present and dilutes the ammonia before it meets with air. The vanadium oxides are conducted through a post-oxidation zone through which air is being conducted in a countercurrent direction and oxidized at a temperature above 500° C. to vanadium pentoxide, which is cooled and recovered. The entire process is carried in a tubular reactor which can be rotated about its longitudinal axis and which is positioned at an incline to the horizontal with the drying zone being at the higher (upper) end of the apparatus. Compared to known processes, the manufacturing time and the acid consumption are considerably reduced using the process and apparatus of this invention with the result that a compact, space-saving installation results which largely avoids contaminating the environment. The granulation of the vanadium pentoxides obtained with the instant invention enables the product to be advantageously stored, transported and processed further without developing dust. The revolving cylinder cannot be attacked by the residual acid from the polyvanadate.

In manufacturing pulverulent vanadium pentoxide, the ammonium vanadate must at the same time be dried and decomposed and the resulting vanadium oxides optionally oxidized. By suitably controlling the decomposition gases, the high $NH_3$ contents of the metavanadate in the decomposition zone can be prevented from coming into contact with hot air. It should moreover be taken into consideration that about 0.6 $m^3$ $NH_3$ are formed from 1 kg of ammonium metavanadate at 600° C. and that this leads to an ammonium concentration within the ignition limits of 14.5–29.5% by volume $NH_3$ at an ignition temperature of 100° C.

At the high temperatures, the high $NH_3$ content causes dissociation to nitrogen and hydrogen and compound formation between nitrogen and vanadium. The inventive control of steam is therefore necessary in order to effect a hydrolysis of the nitrides. In the present invention the steam is passed from the drying zone over the vanadium nitrides that may be formed. At the same time, the steam mixes with the $NH_3$, which greatly diluted in this manner, comes into contact with the hot air required for the post-oxidation.

The post-oxidation is carried out after the steam and the ammonia have been driven off and the vanadium nitrides, which possibly have formed, have been hydrolyzed. The ammonia gas liberated at the end of the decomposition zone with the vacuum pipe fully extended (FIG. 1, dashed line) is passed countercurrently to the material flow so that there can be no reduction of the vanadium pentoxide to $V_2O_3$ and $V_2O_4$. At the same time, this step takes into account the danger of explosion that exists as the hot air of the post-oxidation zone meets with the ammonia gases in the final step of the decomposition zone.

According to the Standard of the Vereins Deutscher Elektroingenieure (VDE 0171 § 13), which is valid in Germany, ammonia belongs to the flammability group G 1. Normally, limiting temperatures of 320° C. are permissible in this flammability group. A safe method of operation is therefore possible only if the ammonia gases are greatly diluted. In accordance with the invention, this takes place by mixing the ammonia with steam and withdrawing the decomposition gases through a vacuum pipe at the end of the decomposition zone.

The $V_2O_5$ portion of the product can be increased to ca. 90% by weight. By these means, the usefulness of vanadium pentoxide to the chemical industry is considerably improved, especially for the manufacture of catalysts. By far the greater portion of known processes operate discontinuously in chamber furnaces which are heated with gas or oil burners. The temperatures range from 300° to 400° C. and the decomposition time amounts to about 36 hours for a charge of 3 tons of $V_2O_5$. Ammonia vanadate, in heaped form, has a low heat conductivity of less than 0.1 kcal per hour, degree and meter. The heat of decomposition is greater than 210 kcal per kilogram. For this reason, batch operation in chamber furnaces is very uneconomical. The ammonia released in a batch operation, acts as a reducing agent and causes the formation of lower valence vanadium oxides and vanadium nitrides during the decomposition process. The product quality in batch operation is therefore frequently inferior to the relatively pure commercial quality, which is required for the manufacture of ferrovanadium metal. Moreover, a product of 90 to 98% by weight $V_2O_5$ is required and the maximum contamination with $V_2O_3$ and $V_2O_4$ is limited to 10% by weight.

The inventive process is described in greater detail in the following by means of two drawings.

Figure 1:
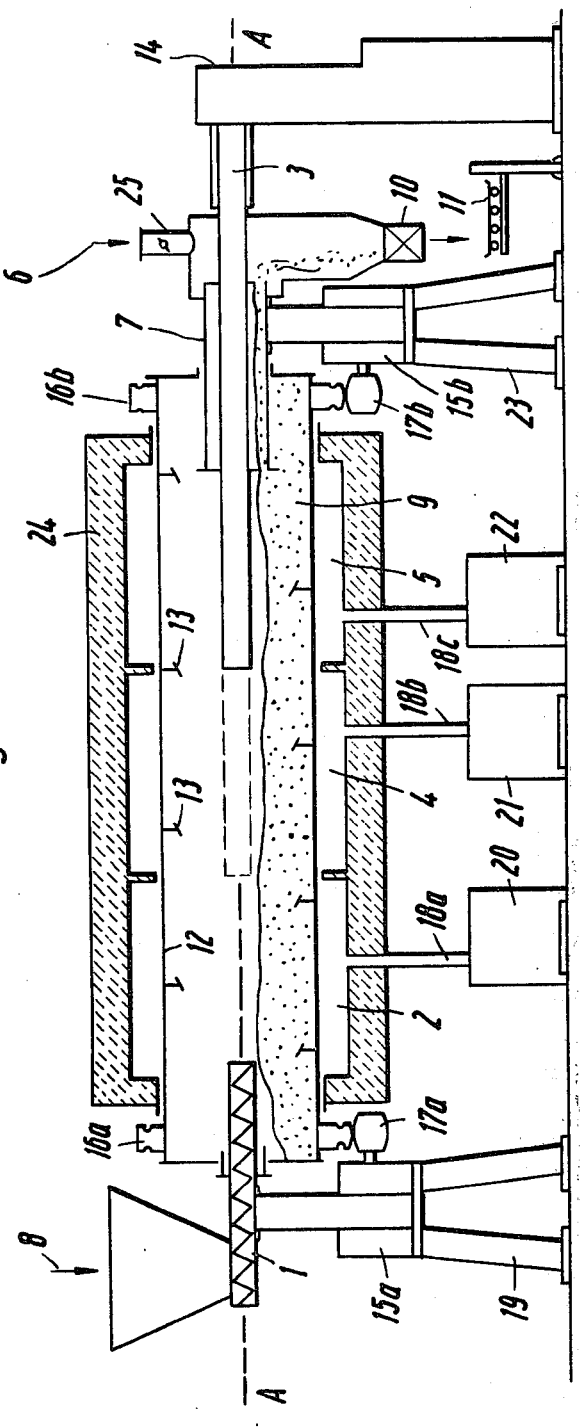
FIG. 1 shows a side elevation of a partial section of a rotary kiln.

In FIG. 1, a proportioning screw 1 is fastened to a bearing block 19. A revolving cylinder 12 with mixing blades 13 shown in cross-section, is mounted so that it can rotate in an axial direction about the proportioning screw. The revolving cylinder 12 is surrounded by a heating mantle 24, which has a drying zone 2, a decomposition zone 4 and a post-oxidation zone 5. In each case, the zones are connected with a heater circuit 18a, 18b, 18c and the corresponding heater units 20, 21, 22. A vacuum pipe 3, with which the decomposition gases are drawn off into a waste-gas purification installation 14, is positioned centrally at the end of the decomposition zone 4. A static tube 7, with which the pure $V_2O_5$ is removed from the interior of the revolving cylinder 12 and conveyed by means of conveyor belt 11 for further processing is positioned coaxially above the vacuum pipe 3. The static tube 7 is connected with an air inlet 25, through which hot air 6 reaches into the interior of the revolving cylinder 12. A further bearing block 23 at the exit end of the revolving cylinder carries the static tube 7, the vacuum pipe 3 and the revolving cylinder 12, which is mounted so that it can rotate in the longitudinal direction. In each bearing block 19, 23, there is a drive unit 15a, 15b, which allows the revolving cylinder to be rotated about the axis AA over a gear unit 16a, 17a and 16b.

In order that the ammonium vanadate can advance in the revolving cylinder, the latter is slightly inclined. It turns out that a good conversion can be achieved with an angle of inclination of 0.2 to 2% of the axis of rotation AA relative to the ground surface. An inclination of 0.5% has proven to be particularly advantageous, this corresponding to an angle of less than 1° relative to the horizontal.

The revolving cylinder is heated indirectly with gas or oil or electrically. The temperatures within the revolving cylinder must be raised slowly. In the drying zone 2, they are between 300° and 500° C. preferably at 420° C. The temperature in the decomposition zone 4 is between 500° and 600° C., preferably at 510° C. The temperature in the post-oxidation zone should be higher than that in the decomposition zone, but not less than 550° C. and not higher than 650° C. The preferred temperature here is 560° C.

The mixing blades 13, mounted in the interior of the revolving cylinder 12, turn in the same direction and effect an intermittent forward movement of the ammonium metavanadate. It was discovered that the most advantageous angle of inclination between the mixing blades 13 and the axis of the cylinder lies between 13° and about 45°. This applies when the revolving cylinder is filled to at least 15% by volume. In a preferred embodiment, the mixing blades are set in such a manner in the drying zone 2 and in the decomposition zone 4 that the ammonium metavanadate is intermittently moved; forward movement predominates so that, after a prolonged dwell time and good mixing, the vanadium pentoxide is moved toward the static tube. The blades in the post-oxidation zone are inclined in such a manner, that all of the vanadium pentoxide is moved turbulently by the air and moves forward with the least possible speed.

The total material flow is determined by the inclination and the rate of revolution of the revolving cylinder 12, as well as by the arrangement and the size of the mixing blades 13. Moreover, the static pipe 7 acts as an overflow or choke and, together with the proportioning screw 1, controls the degree of filling of the revolving cylinder.

It has been found that the most advantageous degree of filling of the revolving cylinder 12 lies between 10 and 30% by volume. In order to achieve an optimum mixing effect and good aeration, the degree of filling is advantageously adjusted to be between 15 and 25% by volume. The product bed 9 permits an adequate dwell time for aeration and for heating the vanadium oxides to the final temperature.

The vacuum pipe 3 is connected with a waste-gas purification installation 14, in which a fan produces a vacuum of about 20 to 200 mm water, corresponding to 2 to 20 mbar. The opening of the vacuum pipe lies in the direction of the material flow at the end of the decomposition zone 4. By means of such an arrangement, it is possible to withdraw the resulting ammonia gas, mixed with water vapor, from the revolving cylinder 12, before it can come into contact with the hot air 6 from the static tube 7. The exact positioning of the opening of the vacuum pipe depends accordingly on the amount of ammonium metavanadate fed in via the proportioning screw 1 and on the throughput per unit time in the decomposition zone. For a high throughput, the opening of the vacuum pipe lies at the end of zone 4 and, for a low throughput, within the first half of the decomposition zone. Pressure is equilibrated via air inlet 25 and static tube 7, whereby the inflowing air can be diverted in the revolving cylinder 12, so that it flows over the already decomposed vanadium oxide and acts as a post-oxidizing agent. In the embodiment shown, the static tube, as well as the mixing blades, are utilized as the diverting agents. The yield and the purity of the vanadium oxide are particularly favorable, if hot air of between 100° and 600° C. and preferably of 300° C. is used. Any commercial preheater for air, which can be heated either directly with electricity or indirectly with gas, oil, coal or steam, is suitable for preheating the air.

The material of construction of the revolving cylinder 12 must satisfy the requirements in regards to temperature stability, mechanical strength and chemical resistance. Numerous experiments showed that a heat-treated steel is the material suitable for this purpose. Additions of chromium, nickel, titanium and/or niobium have a particularly favorable effect. The following alloys have shows themselves to be especially resistant at the given temperatures in the presence of ammonium metavanadate and $V_2O_5$: x10 CrNiTi 18 9 (Material No. 1.4541) and x10 CrNiNb 18 9 (Material No. 1.4550). The last-mentioned material has shown an even better result in regard to its temperature behavior. In referring to the foregoing materials, we have utilized the conventional abbreviated code and material numbers used in the German Federal Republic for the respective alloy. The compositions of these alloys are defined, for example, at pages 126 and 127 of Stahl-Eisen-Liste (Steel-Iron Lists) published in 1975 by Verlag Stahleisen M.B.H., Dusseldorf (German Federal Republic). Accordingly, it will be understood that alloy X10CrNiTi189 consists essentially of: up to 0.1 percent C, up to 1 percent Si, up to 2 percent Mn, at least 0.045 percent P, at least 0.03 percent S, 17-19 percent Cr and 9-11.5 percent Ni. Similarly, it will be understood that the alloy designated as X10CrNiNb189 consists essentially of: up to 0.1 percent C, up to 1 percent Si, up to 2 percent Mn, at least 0.045 percent P, at least 0.03 percent S, 17-19 percent Cr and 9-11.5 percent Ni.

Figure 2:
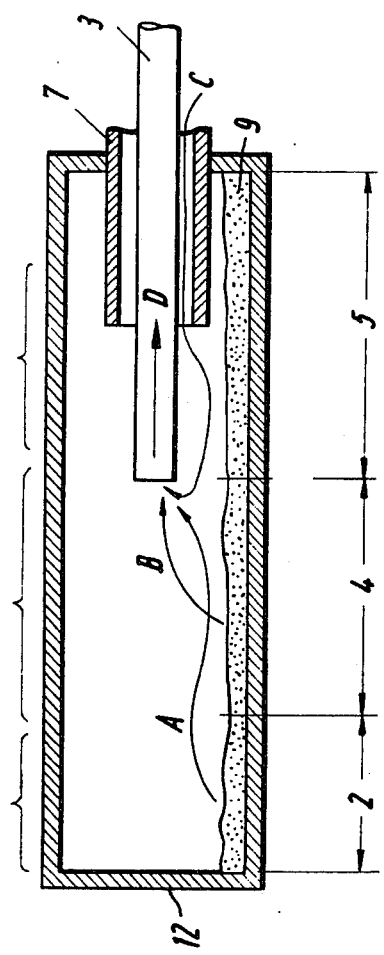
FIG. 2 is a basic diagram of the gas flow during the decomposition.

FIG. 2 represents the gas circulation in the respective treating zones. The ammonium metavanadate in the revolving cylinder 12 is in the drying zone 2 and is heated there to about 400° C. In so doing, steam A is initially driven off and exhausted by pipe 3 over the material bed 9, which has already been heated further. The essentially water-free product of the drying zone 2 is now advanced into the decomposition zone 4 by the intermittent forward-backward motion of the material in the revolving cylinder. Ammonia gas B is driven off in the decomposition zone 4 and, after admixture with steam, is exhausted by the pipe 3. The vanadium nitrides, formed in the decomposition, are hydrolyzed by steam A and the combined nitrogen is thereby split off. The thermal decomposition of ammonium metavanadate is based on the following equations:

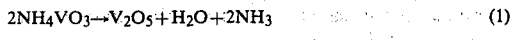
$$2NH_4VO_3 \rightarrow V_2O_5 + H_2O + 2NH_3 \quad (1)$$

$$2VN + 3H_2O \rightarrow V_2O_3 + 2NH_3 \quad (2)$$

After water and ammonia have been driven off, the vanadium oxides, present in the material bed 9, reach the oxidation zone 5, where they are heated to a higher temperature than that used in the decomposition zone, but not less than about 550° C. and not higher than about 650° C. Lower valent vanadium oxides are oxidized to $V_2O_5$ through post-oxidation by means of the inflowing fresh air C. A complete oxidation can only be achieved with a specific air throughput. This amounts to 0.2 to 0.6 cbm air per kg of ammonium metavanadate. Numerous investigations have futhermore shown that air can be circulated through the material bed 9 only if the degree of filling of the revolving cylinder is 10 to 30% by volume. A particularly advantageous circulation of the air is achieved with the cylinder filled to between about 15-25% by volume at a throughput of 0.3 cbm of air per kg of ammonium metavanadate. The end product leaving the oxidation zone contains more than 90% $V_2O_5$, is deficient in lower valent vanadium oxides and contains practically no vanadium nitrides. It is a dry, pulverulent material, that can be used particularly advantageously as catalyst material.

The dimensions of the static pipe 7 have an effect on the degree of filling by the material and on the rate at which the material is advanced in the revolving cylinder. Instead of the static tube 7, a static plate can also be used. The internal-hole diameters of both baffle agents should not amount to more than half the diameter of the revolving cylinder. A cell lock 10 acts as terminal part for the static tube 7 and therefore also for the revolving cylinder 12 (see FIG. 1). This can also be fashioned as a double-pendulum flap. It prevents the incorrect entry of air, which can easily occur as vanadium pentoxide is ejected onto the conveyor belt 11.

As it passes over the material bed 9, the current of air C carries along dust particles and introduces them via the vacuum pipe 3 over the pump and waste-gas installation 14 (FIG. 1). At the opening of the vacuum pipe, this particle-containing current of air meets the ammonia gas current B, that is mixed with steam. The danger of explosion is avoided by the particular concentration relationships. Control of the decomposition gases on the one hand and of the oxidizing agent on the other, permits safe operation in the dangerous concentration range. The gas circulation can be controlled by displacing the vacuum pipe 3 in axial direction to the revolving cylinder 12. The length of the vacuum pipe 3 is so dimensioned that the steam from the drying zone 2 dilutes the expelled ammonia gas, before the latter comes into contact with the current of air C.

The inventive process is illustrated in the following by means of some examples and compared with known processes. Table 1 shows a comparison between a known, discontinuously operated, chamber furnace and the revolving cylinder with short and long (dashed line) vacuum pipe 3 of the present invention according to FIG. 1.

The chamber furnace was operated with ammonium polyvanadate of formula $(NH_4)_2V_6O_{16}$, that had a vanadium content of 51.15% and an $NH_3$ content of 5.68%. The ammonium polyvanadate was prepared by precipitation at a pH of 2.1.

Ammonium metavanadate of formula $NH_4VO_3$, containing 43.56% vanadium and 14.54% $NH_3$, was introduced into the revolving cylinder. The ammonium metavanadate was prepared at a pH greater than 8.

The revolving cylinder had a length of 1,600 mm and a diameter of 300 mm. The inclination of the revolving cylinder was 0.5% (with the drying zone at the higher end of the incline), the rate of revolution 3 revolutions per minute and the degree of filling 7%. The temperature in the drying zone and in the decomposition zone was 500° C. and in the post-oxidation zone 550° C. The duration of the experiment was eight hours.

Table 2 shows a survey of the operational data for the inventive revolving cylinder. The amount of fresh air, the temperature in the respective heating zones, the degree of filling and the rate of revolution as well as the inclination of the revolving cylinder were varied. Furthermore, the moisture content, the throughput and the experimental time were changed. The results show that the best analytical values were obtained for Experiment No. 2. All three vanadium products are of sufficient purity to be used for preparing catalysts. A typical analysis in the chemical industry in respect to the purity of the vanadium product is given in the following Table:

$V_2O_5$: at least 98.5%
$V_2O_3 + V_2O_4$: less than 0.8%
VN: less than 0.2%
other impurities: less than 0.5%

In the experimental examples described in Table 2, the dimensions of the revolving cylinder 12 were maintained at the above-described values. An ammonium metavanadate of the following composition (anhydrous) was selected as the starting material:

V = 43.1%
$NH_3$ = 14.2%
$Na_2O$ = 0.1%
$SiO_2$ = 0.2%

In summary, the invention can be represented as a process and an apparatus for manufacturing vanadium pentoxide ($V_2O_5$) by the thermal decomposition of ammonium metavanadates. The object of the process is the continuous manufacture of vanadiac acid, that is essentially free of lower valent vanadium oxides ($V_2O_3$) and vanadium nitrides. The process comprises the following general steps: Ammonium metavanadate is maintained in a first zone at a certain, initial temperature. The ammonium metavanadate is heated in the first zone until the water has essentially been evaporated from the ammonium metavanadate and a dry material is present. The dried material is conveyed to a second zone. In the second zone, the dried material is heated to a second temperature in order to form vanadium oxide, ammonia and residual water vapor, and to hydrolyze parts of the material. The vanadium oxide is conveyed to a third zone, where the temperature is higher than in the first and second zones, in order to form vanadium pentoxide at this temperature. The vanadium pentoxide is cooled.

TABLE 1

| Equipment Example No. | Chamber Furnace Discontinually Operated 0 | Revolving Cylindrical Reactor(continuous) Vacuum Pipe | |
|---|---|---|---|
| | | Long 1 | Short 2 |
| Throughput in kg per hour and $m^2$ of heating surface | 10.— | 14.3 | 20.5 |
| Throughput in kg per $m^3$ of furnace capacity and hour | 14 | 197 | 282 |
| Quality in % | | | |
| $V_2O_5$ | 79.2 | 91.1 | 98.9 |
| $V_2O_3$ and $V_2O_4$ | 17.2 | 7.1 | 0.6 |
| VN | 3.2 | 1.4 | 0.1 |
| Other impurities | 0.4 | 0.4 | 0.4 |

TABLE 2

| Parameter | | Experiment No. | | |
|---|---|---|---|---|
| | | 2 | 3 | 4 |
| Amount of fresh air | ($m^3$/h) | 15 | 15 | 22 |
| Drying zone | (°C.) | 420 | 500 | 300 |
| Decomposition zone | (°C.) | 510 | 500 | 600 |
| Oxidation zone | (°C.) | 560 | 550 | 650 |
| Degree of filling | (Vol.%) | 20 | 25 | 15 |
| Rate or revolution | (upm) | 7 | 4 | 3 |
| Inclination | (%) | 0.5 | 1 | 1.5 |
| Amount of Ammonium Metavanadate | (kg/h) | 51 | 58.6 | 50 |
| Moisture content | (%) | 18.2 | 24.8 | 6.3 |
| Duration of experiment | (h) | 10 | 16 | 83 |
| Total ammonium vanadate throughput | (kg) | 510 | 938 | 4144 |
| Amount of end product | (kg) | 318 | 479 | 2638 |
| color of powder | | yellow | yellow | yellow |
| Analysis: | | | | |
| $V_2O_5$ | (%) | 98.9 | 98.8 | 98.7 |
| $V_2O_3$ and $V_2O_4$ | (%) | 0.6 | 0.7 | 0.7 |
| VN | (%) | 0.1 | <0.1 | 0.2 |
| Other impurities | (%) | 0.4 | 0.4 | 0.4 |
| Capacity of the decomposer kg per hour and $m^2$ of heating surface | | 20.5 | 19.8 | 21 |
| kg per hour and $m^3$ of reactor capacity | | 282 | 272 | 289 |

What is claimed is:

1. In an apparatus for the manufacture of vanadium pentoxide which comprises a hollow enclosure rotatable about its longitudinal axis, means for rotating said enclosure about said axis, means for heating said enclosure, a plurality of rotatable mixing blades in the interior of said enclosure, improved means for controlling the internal pressure within said enclosure comprising:

a vacuum pipe coaxially mounted to extend within said enclosure, means connected to said pipe for withdrawing gas from within said enclosure, an air inlet port in said enclosure, and means mounting said vacuum pipe to said enclosure for axial movement with respect thereto, so that the projection of said vacuum pipe into said enclosure is axially adjustable.

2. Apparatus as defined by claim 1 wherein said means for rotating said enclosure about the longitudinal axis comprises a gear mechanism engaging at least one exterior surface of said cylinder, and an electrical drive motor connected to said gear.

3. Apparatus according to claim 2 wherein said mixing blades are inclined at an angle of between about 13° and about 45° with respect to the longitudinal axis of said enclosure.

4. Apparatus as defined by claim 3 which comprises a static pipe coaxially mounted about said vacuum pipe and operating in conjunction with said air inlet for admitting air into the lumen of said enclosure.

5. Apparatus as defined in claim 4 further comprising an endless screw-loading device positioned at the higher end of said enclosure and conveying a chemical composition from a storage hopper to the interior surface of said enclosure.

6. Apparatus as defined by claim 5 wherein said static pipe has an internal diameter less than one half the diameter of said enclosure.

7. Apparatus as defined in claim 6 wherein said enclosure comprises a steel alloy.

8. Apparatus as defined by claim 7 wherein said steel alloy comprises x10 CrNiTi 18 9.

9. Apparatus as defined by claim 7 wherein said steel alloy comprises x10 CrNiNb 18 9.

10. Apparatus as defined by claim 7 further comprising a heating sleeve coaxially disposed about said enclosure.

11. Apparatus as defined by claim 10 wherein said heating sleeve is subdivided into a plurality of separate heating areas sequentially arranged adjacent to one another, each of said areas indirectly heating a corresponding portion of said enclosure to a predetermined temperature.

12. Apparatus for the manufacture of vanadium pentoxide in dry powder form which comprises a hollow enclosure rotatable about its longitudinal axis, means for rotating said enclosure about said longitudinal axis, means for loading a first chemical product at one end of said enclosure, means for conducting said chemical product through said enclosure, means for withdrawing gases evolved upon heating said chemical product from said enclosure and located therein, said means extending longitudinally from one end of said enclosure toward said loading end, means for admitting air into said enclosure near said one end, and means for heating a plurality of predetermined portions of said enclosure in open communication with one another to respectively different predetermined temperatures.

13. Apparatus according to claim 12 wherein said enclosure comprises a steel cylinder.

14. Apparatus as defined by claim 1 which comprises a static pipe coaxially mounted about said vacuum pipe and operating in conjunction with said air inlet for admitting air into the lumen of said enclosure.

15. Apparatus according to claim 12 wherein said heating means comprises a stationary heating sleeve spaced apart from said substantially surrounding said enclosure, said sleeve being subdivided into separate heating areas each positioned to heat one of said enclosure portions and each adapted to receive heat from a different source.

16. In an apparatus for the manufacture of vanadium pentoxide which comprises a hollow enclosure having an inlet end for reactants and outlet end for vanadium pentoxide, said enclosure being rotatable about its longitudinal axis, and means for heating said enclosure, the improvement comprising:

a vacuum pipe mounted to extend within said enclosure from said outlet end toward said inlet end;

means connected to said pipe for withdrawing gas from within said enclosure;

an air inlet port in said enclosure disposed near the outlet thereof.

17. Apparatus for the manufacture of vanadium pentoxide which comprises:

a hollow enclosure rotatable about its longitudinal axis, said enclosure having an inlet end for reactants and an outlet end for vanadium pentoxide, means for rotating said enclosure about said longitudinal axis, a heating sleeve spaced apart from and substantially surrounding said enclosure, said sleeve being subdivided into three separate heating areas, each of said areas positioned to produce indirect heat to a predetermined portion of said enclosure and associated with a separate heat source, a plurality of rotatable mixing blades fixed to the interior of said enclosure, a vacuum pipe coaxially mounted to extend within said enclosure from said outlet, a vacuum pump connected to said vacuum pipe for withdrawing gas from said enclosure, means for admitting air into said enclosure near the outlet end thereof, means for maintaining each of said heating zones at a separate temperature, means for loading a moist chemical composition into one end of said enclosure; and a static pipe coaxially mounted about said vacuum pipe and operating in conjunction with said air inlet for admitting air into the lumen of said enclosure.

18. Apparatus for the manufacture of vanadium pentoxide which comprises:

a hollow enclosure rotatable about its longitudinal axis, said enclosure having an inlet end for reactants and an outlet end for vanadium pentoxide, means for rotating said enclosure about said longitudinal axis, a heating sleeve spaced apart from and substantially surrounding said enclosure, said sleeve being subdivided into three separate heating areas, each of said areas positioned to produce indirect heat to a predetermined portion of said enclosure and associated with a separate heat source, a plurality of rotatable mixing blades fixed to the interior of said enclosure, a vacuum pipe coaxially mounted to extend within said enclosure from said outlet, a vacuum pump connected to said vacuum pipe for withdrawing gas from said enclosure, means for admitting air into said enclosure near the outlet end thereof, means for maintaining each of said heating zones at a separate temperature, means for loading a moist chemical composition into one end of said enclosure and said vacuum pipe extending from said outlet end towards said inlet end.

* * * * *